United States Patent
Ware

[11] 3,880,450
[45] Apr. 29, 1975

[54] COUPLER

[75] Inventor: Nathan C. Ware, North Muskegon, Mich.

[73] Assignee: Lear Siegler Inc., Santa Monica, Calif.

[22] Filed: June 7, 1973

[21] Appl. No.: 367,855

[52] U.S. Cl. .............................................. 280/512
[51] Int. Cl. ............................................. B60d 1/06
[58] Field of Search ........................... 280/511, 512

[56] References Cited
UNITED STATES PATENTS

| | | | |
|---|---|---|---|
| 1,927,591 | 9/1933 | Jacob | 280/512 |
| 1,977,065 | 10/1934 | Jacob | 280/512 |
| 3,759,549 | 9/1973 | Morris | 280/512 |

Primary Examiner—Robert R. Song
Attorney, Agent, or Firm—McGarry & Waters

[57] ABSTRACT

A coupler for a trailer and the like, the coupler having a body and cap hinged together at a front portion and closeable along parting faces with an internal cavity formed by the body and the cap for a ball which is conventionally secured to the towing vehicle. The body forms a major portion of the ball cavity and includes a ball centering upper surface which extends substantially laterally across the upper surface of the cavity forming a self-centering bearing surface for the ball. A load distributing means is uniquely formed on a rear portion of the parting faces of the body and cap to restrain relative vertical movement between the body and cap along the parting faces thereof. The load distributing means includes a horizontal shelf extending from the ball cavity and a complementary recess, with the horizontal shelf preferably being formed on the parting face of the body. The parting faces are desirably vertical adjacent the ball cavity and juxtaposed locking flanges extend upwardly from the vertical faces of the body and cap. Holes in registry with each other extend through the locking flanges so that the cap and body can be padlocked in the closed position.

11 Claims, 5 Drawing Figures

COUPLER

BACKGROUND OF THE INVENTION

1. Field of the Invention

This invention relates to couplers for trailers and the like. In one of its aspects, the invention relates to a coupler having a self-centering ball cavity. In another of its aspects, the invention relates to a coupler for trailers and the like wherein a cap is hinged to a body at a front portion and load distributing means are provided at a back portion so that the load on the coupler is distributed between the front and back portions thereof.

In still another of its aspects, the invention relates to a self-centering coupler for trailers and the like wherein means are provided for padlocking the coupler in its closed position.

2. State of the Prior Art

Jacob, in U.S. Pat. Nos. 1,927,591 and 1,977,065, discloses a trailer hitch in which a body and a cap are hinged at a front portion and form hemispherically shaped cavities for enclosing a coupling ball. A collar is spring biased in a forward position on a rear portion of the body and releasably latches the cap in closed position around the ball. In the Jacob U.S. Pat. No. 1,927,591, a recess is formed in the shank of the body behind the ball cavity and a portion of the cap fits within the recess when the cap is closed to the body. In the Jacob U.S. Pat. No. 1,977,065, a boss is formed on the body on the parting face and the cap has a corresponding recess which fits over the boss when the cap is closed to the body. The cap has a tapered side surface against which the collar bears for snug fit of the cap around the ball. The spring biased collar rides up on the tapered surface so that the collar automatically adjusts the cap for different size balls and for wear between the ball and the cavity or socket therefor.

The Jacob trailer hitches have vertical parting surfaces and can be provided with locking flanges in juxtaposition to each other above the ball cavity for padlocking the cap to the body in closed position. Such trailer hitches have been in successful use for many years and are still in such use.

Another type of trailer hitch in use has the same type of spring biased collar but the body forms approximately three-fourths of the ball cavity. The body thus provides a top bearing surface for the ball and automatically centers the ball within the ball cavity prior to the closing of the cap. The cap provides approximately one-quarter of the ball cavity and meets the body along horizontal faces at the side of the coupler. It would be desirable to have the padlock features for the self-centering type of coupler to prevent theft of the trailer, but such feature is not practical with the self-centering type of coupler in view of the horizontal facing surfaces of this type of coupler. These types of couplers would require horizontally extending flanges with a slot therein to provide for some relative movement between the cap and the coupler. Further, laterally projecting flanges would be undesirable in that they might tend to get broken off or deformed by accidental blows.

SUMMARY OF THE INVENTION

According to the invention, a self-centering coupler has vertical parting faces and has vertically extending locking flanges with aligned holes for padlocking of the coupler in the closed position. Further, load distributing means are provided on a rear portion of the parting faces of the body and cap to restrain vertical movement of the cap both upwardly and downwardly with respect to the body.

Briefly, the invention comprises a coupler for trailers and the like wherein a ball is secured to the vehicle and the coupler has a body and cap hinged together at a front portion and closeable along parting faces thereof around the ball. Each of the body and cap have internal recesses forming a cavity or socket for the ball when the body and cap are closed along the parting faces thereof. Means releasably latch the cap and body in the closed position. The recessed cavity of the body forms a major portion of the ball cavity and includes a ball centering upper surface which extends substantially laterally across the upper surface of the ball cavity and forms a self-centering bearing surface for the ball. Load distributing means are provided on a rear portion of the parting faces of the body and cap to restrain movement of the cap vertically with respect to the body.

Desirably, the load distributing means includes a horizontal shelf, preferably on the body, extending from the ball cavity, and a complementary recess on the parting face of the cap.

The parting faces of the cap and body extend vertically at the ball cavity and upwardly extending locking flanges are provided at the locking faces. The locking flanges are juxtaposed to each other and have aligned openings extending therethrough so that the cap and body can be padlocked in the closed position.

BRIEF DESCRIPTION OF THE DRAWINGS

The invention will now be described with reference to the accompanying drawings in which.

DESCRIPTION OF THE PREFERRED EMBODIMENT

Figure 1:
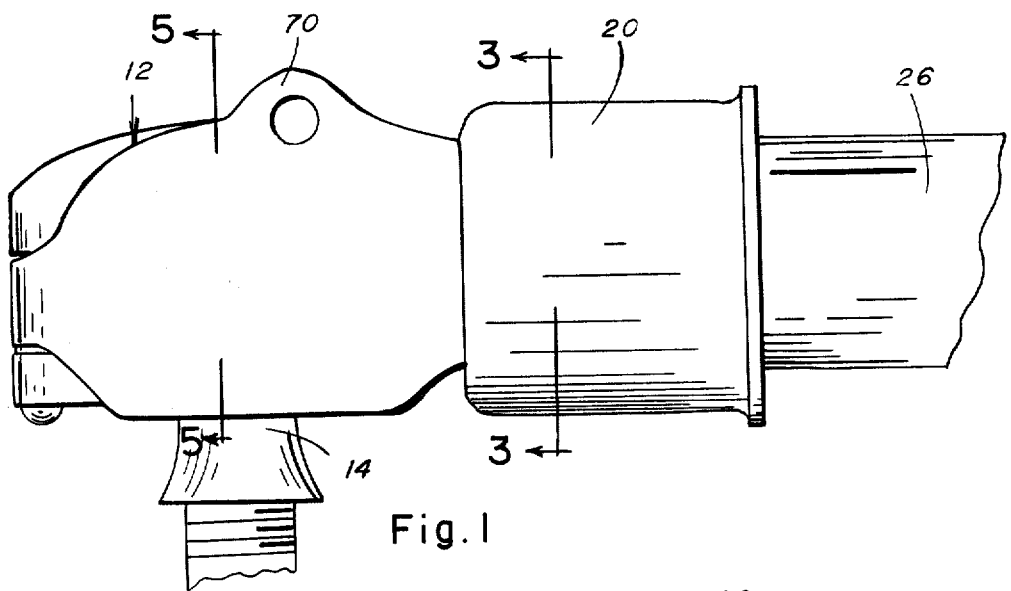
FIG. 1 is a side view of the coupler according to the invention as viewed from the driver's side of a vehicle to which the coupler may be attached.

Referring now to the drawings, there is shown a coupler 12 enclosing a conventional ball 14. The coupler is formed from a body 16 and a cap 18 which are hinged together at front portions thereof. A collar 20 is slidably mounted on the back portion of the body 16 and is biased to a closed position by a spring 22 which abuts a retaining ring 24 at the back portion and the rolled end of the collar 20 at a front portion. The retaining ring 24 is fixed in position between the forward end of a tongue 26 and a shoulder 27 on the body 16. The tongue 26 is secured to the back portion of the body 16 in conventional fashion such as by rivets, welding, and the like.

Figures 3, 5:
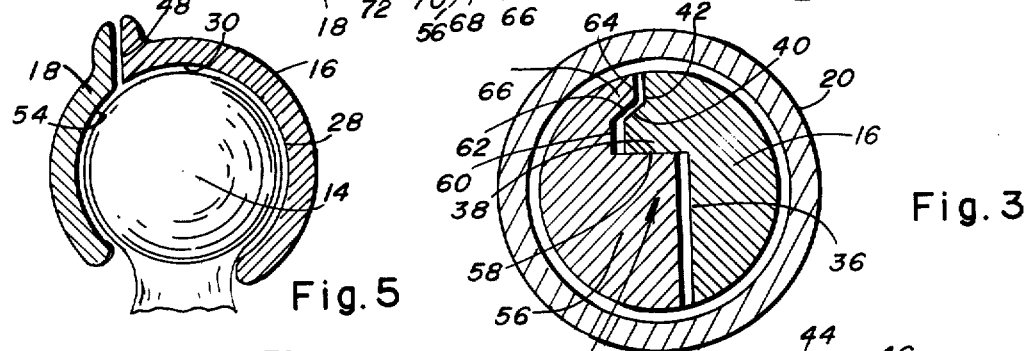
FIG. 3 is a sectional view taken along lines 3—3 of FIG. 1.
FIG. 5 is a sectional view taken along lines 5—5 of FIG. 1.

The body 16 has a hollow ball cavity recess 28 with a ball centering upper surface 30. As illustrated in FIG. 5, the upper surface 30 of the ball cavity 28 extends substantially laterally past the centerline of the ball so that the ball is substantially supported at the upper portion by the upper surface 30. The body 16 has a recess 32 at a front portion thereof forming a part of the hinge between the body 16 and the cap 18. The body has a rearwardly and laterally sloping surface 34 extending substantially from the ball cavity 28 back to a surface 36 which slants rearwardly and laterally in a direction opposite to the surface 34. As seen in phantom lines in FIG. 2, the surface 34 slopes inwardly and back toward the top right of the drawing and the surface 36 slopes outwardly and back toward the bottom right of the drawing. A load distributing ledge 38 is formed above the surface 36. The ledge 38 has a slanted upper return surface 40 as seen in FIG. 3 terminating in a vertical surface 42. Thus, the surfaces 40 and 42 form a recess in the upper portion of body 16 behind the ball cavity 28.

Figure 2:
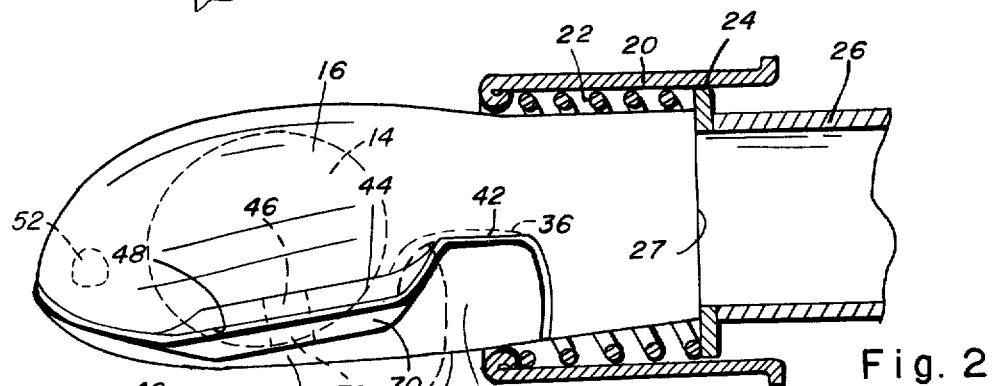
FIG. 2 is a top view of the coupler with the collar broken away.

An upstanding flange 44 having an opening 46 therein extends upwardly over the ball cavity 28 in body 16. The upstanding flange 44 is positioned at the parting faces of the body 16 as seen in FIGS. 2 and 5.

The cap 18 has a front protuberance 50 which fits within the recess 32 of the body 16 and through which extends a pin 52, making a hinge between the cap 18 and the body 16. A recess 54 having a partial spherical shape is formed in the interior side of the cap 18. As seen in FIG. 5, the surface 54 is substantially less than a hemispherical surface but forms with the ball cavity 28 a cavity or socket to substantially enclose the ball 14.

At the back portion of the cap 18 a lateral protuberance 56 is formed to fit within the recess formed by surfaces 34 and 36 and in the body 16. The protuberance 56 has an upper surface 58 which abuts the bottom surface of the ledge 38. Above the surface 58, the cap wall extends upwardly at 60 and then slants inwardly again toward the body 16 at 62 over the top of the slanted surface 40 of the body 16. A vertical surface 64 completes the interface of the cap 14. Thus, latching projection 66 extends from the face of the cap 18 and is bounded by the surfaces 60, 62, and 64. The projection 66 extends into the recess of the body 16 formed by slanted surface 40 and vertical surface 42.

The cap has a vertical flange 70 similar to flange 44 on body 16 with a hole 72 therein. Holes 72 and 46 are aligned with each other when the cap is in the closed position illustrated in FIG. 2 so that the coupling may be padlocked in the closed position. Thus, the novel coupling provides a system whereby the coupling can be locked so that the trailer is protected from theft when it is secured to the ball.

The outer portion 68 of the back end of the cap 18 slants outwardly and forwardly as illustrated in FIG. 2 so that the cap 18 and body 16 are forced together as the collar 20 rides forward. The tapered outer portion 68 of the cap 18 permits the cap to adjust for wear between the ball and ball cavity. The body 16 and cap 18 are biased towards each other by the action of the cap bearing against the sides of the body 16 and cap 18. The collar 20 will ride up on the outer portion 68 until a given resistance is met, as the ball 14 and/or the interior surfaces of the recesses 28 and 54 wear, the cap 18 and body 16 will be forced closer together by the collar 20.

Figure 4:
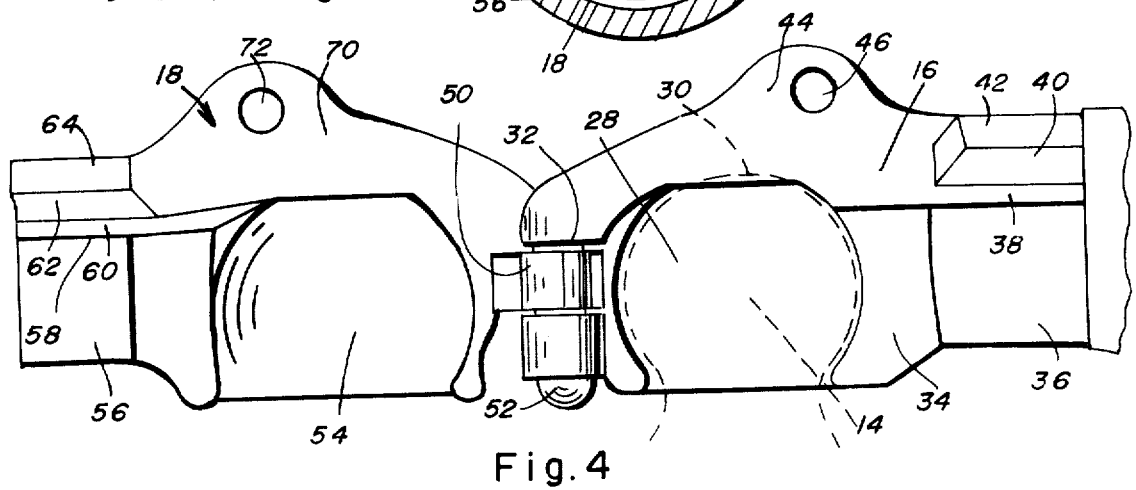
FIG. 4 is a view of the coupler in the open position.

One of the principal features of the invention is the ledge 38 and the corresponding cavity in the cap 18. As seen in FIG. 3, the ledge 38 prevents the cap 18 from riding upwardly with respect to the body 16 and likewise restricts downward movement of the cap 18 with respect to the body 16, thereby distributing the loading forces between the hinge at the front of the coupling and the ledge 38 at the rear portion of the coupling. These forces are applied to the cap during normal operation of the coupling mechanism. In normal operation, the ball may apply torque to the cap 18 which would tend to move the cap about a central axis perpendicular to the plane of the drawing as viewed in FIG. 3. The shelf 38 provides firm support against this type of movement. In a similar manner, the cap may have a tendency to be forced downwardly and about the central axis whereby the upper surface 40 of the ledge 38 restrains and supports the cap against such movement. This novel and inventive structure provides essentially a second area of support in addition to the hinge mounting at the front of the coupler. The ledge thus reduces the amount of force which would otherwise be applied to the hinge at the front of the coupler. Such a structure has not been heretofore provided in couplers with self-centering ball cavities. As seen in FIGS. 2, 3, and 4, the cutaway portion of the body formed by vertical surface 42 and slanted surface 40 also forms a means for restraining biaxial movement of the cap with respect to the body. The projection 66 of the cap fits snuggly within the cutaway portion of the body and the cap is thus held at the rear portion against biaxial movement.

Another feature of the invention is that the coupler has a ball centering upper surface 30 which centers the ball within the cavity and vertical flanges extending from vertical parting surfaces for padlocking the coupler in the closed position. Such structure was not heretofore available because of the horizontal parting surfaces in the self-centering types of couplers.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a coupler for a trailer wherein a ball is secured to a vehicle and said coupler has a body and a cap hinged together at a front portion with a substantially vertical pin so that said cap pivots about a front portion of the body, said body and cap being closeable along parting faces thereof, each of said body and cap having internal recesses forming a cavity for said ball when said body and cap are closed along the parting faces thereof; and means for releasably latching said cap to said body in closed position; the improvement which comprises;

said body recessed cavity forming a major portion of said ball cavity and including a concave upper surface which extends substantially laterally across the upper surface of said ball cavity and forms a self-centering bearing surface for said ball;

load distributing means on a rear portion of said parting faces of said body and cap to restrain movement of said cap with respect to said body along the parting faces thereof in a direction parallel to the pin;

whereby the load on said coupler is distributed between said hinge on the front of said coupler and said load distributing means at a rear portion thereof.

2. A coupler according to claim 1 wherein said load distributing means includes a horizontal shelf extending from said ball cavity on one of said body and cap and a complementary recess on the other.

3. A coupler according to claim 2 wherein said horizontal shelf is formed on said body and said complementary recess is formed on said cap.

4. A coupler according to claim 3 wherein a horizontal undercut recess is formed beneath said shelf in said body and said shelf is formed at the upper portion by a sloping surface.

5. A coupler according to claim 4 wherein said parting faces extend vertically at said ball cavity and further comprising an upwardly extending locking flange extending from each of said body and cap, said locking flanges being in juxtaposition to each other and having aligned openings extending therethrough, whereby said cap and body can be padlocked in closed position.

6. A coupler according to claim 5 wherein at least one of said cap and body have side surfaces tapering inwardly and rearwardly, said releasable latching means comprises a collar slidable on said body from a rear position, allowing opening of said cap, to a forward latching position wherein said collar encircles said cap and body, said collar being shaped so as to bear against said tapered side surface, and means biasing said collar to said latching position whereby said collar automatically compensates for wear on the ball or ball cavity.

7. A coupler according to claim 1 wherein said parting faces extend vertically at said ball cavity and further comprising an upwardly extending locking flange extending from each of said body and said cap, said locking flanges being in juxtaposition to each other and having aligned openings extending therethrough, whereby said cap and body can be padlocked in closed position.

8. A coupler according to claim 1 wherein at least one of said cap and said body has side surfaces tapering inwardly and rearwardly, said releasable latching means comprises a collar slidable on said body from a rear position, allowing opening of said cap, to a forward latching position wherein said collar encircles said cap and body, said collar being shaped so as to bear against said tapered side surface, and means biasing said collar to said latching position whereby said collar automatically compensates for wear on the ball or ball cavity.

9. A coupler according to claim 1 wherein said body is cut away at an upper rear portion thereof, forming said load distributing means, and also forming a means for restraining biaxial movement of said cap with respect to said body; and a projection formed on said cap extending upwardly and toward said body to fit snuggly in said cutaway portion of said body.

10. In a coupler for a trailer wherein a ball is secured to a vehicle and said coupler has a body and a cap hinged together at a front portion so that said cap pivots about a front portion of said body, said cap and body being closeable along parting faces thereof, each of said body and cap having internal recesses forming a cavity or socket in said ball when said body and cap are closed along the parting faces thereof, and means for releasably latching said cap to said body in the closed position; the improvement which comprises:

said body recessed cavity forming a major portion of said ball cavity and including a concave upper surface which extends substantially laterally across the upper surface of said ball cavity and forms a self-centering bearing surface for said ball;

said parting faces extending vertically at said ball cavity;

an upwardly extending locking flange extending from each of said body and cap, said locking flanges being juxtaposed to each other and having aligned openings extending therethrough;

whereby said cap and body can be padlocked in closed position.

11. A coupler according to claim 10 wherein at least one of said cap and body have side surfaces tapering inwardly and rearwardly, said releasable latching means comprises a collar slidable on said body from a rear position, allowing opening of said cap, to a forward latching position wherein said collar encircles said cap and body, said collar being shaped so as to bear against said tapered side surface, and means biasing said collar to said latching position, whereby said collar automatically compensates for wear on the ball or ball cavity.

* * * * *